(12) United States Patent
Holcomb et al.

(10) Patent No.: US 6,860,016 B2
(45) Date of Patent: Mar. 1, 2005

(54) CITRUS FRUIT SEGMENTER

(75) Inventors: David A. Holcomb, Seattle, WA (US);
Joshua R. Stewart, Seattle, WA (US)

(73) Assignee: Chef'N Corporation, Seattle, WA (US)

( * ) Notice: Subject to any disclaimer, the term of this patent is extended or adjusted under 35 U.S.C. 154(b) by 162 days.

(21) Appl. No.: 10/255,802

(22) Filed: Sep. 25, 2002

(65) Prior Publication Data

US 2004/0055162 A1 Mar. 25, 2004

(51) Int. Cl.⁷ .......................... A21C 15/04; A21C 5/08
(52) U.S. Cl. .................. 30/114; 30/123.6; 30/123.7; 425/281
(58) Field of Search ................ 30/123.6, 124, 30/123.7, 114; 425/281, 284, 285

(56) References Cited

U.S. PATENT DOCUMENTS

| | | | |
|---|---|---|---|
| 1,339,367 A | 5/1920 | Risdon | |
| 1,538,398 A | 5/1925 | Grainge | |
| 1,542,352 A | 6/1925 | Ankeny | |
| 1,614,451 A | 1/1927 | Barfield | |
| 1,668,226 A | 5/1928 | Barfield | |
| 1,794,800 A | 3/1931 | Smith | |
| 2,051,680 A | 8/1936 | Collens | 146/3 |
| 2,092,550 A | 9/1937 | Davis | 146/3 |
| 2,257,202 A | 9/1941 | Taylor | 30/316 |
| 2,301,289 A | 11/1942 | Knepper | 146/3 |
| 2,321,725 A | 6/1943 | Alderfer | 30/24 |
| 2,463,166 A | 3/1949 | Geier et al. | 242/120 |
| 2,503,097 A | 4/1950 | Chavez | 146/3 |
| 2,733,746 A | 2/1956 | Rauner | 146/3 |
| 2,737,713 A | 3/1956 | Spafford | 30/24 |
| 2,797,478 A | 7/1957 | Gebhart et al. | 30/24 |
| 3,018,808 A | 1/1962 | Belk | 146/236 |
| 3,045,729 A | 7/1962 | Belk et al. | 146/3 |
| 3,072,160 A | 1/1963 | Grotewold | 146/3 |
| 3,073,365 A | 1/1963 | Polk, Jr. et al. | 146/3 |
| 3,088,507 A | 5/1963 | Mulford | 146/3 |
| 3,102,566 A | 9/1963 | Willis | 146/3 |
| 3,105,531 A | 10/1963 | Belk | 146/3 |
| 3,113,603 A | 12/1963 | Gardiner | 146/43 |
| 3,888,000 A | 6/1975 | Ladlow | 30/114 |
| 3,961,418 A | 6/1976 | Neveu | 30/123.5 |
| 4,580,343 A | 4/1986 | Bell, Jr. | 30/114 |
| 4,959,903 A | 10/1990 | Daoust et al. | 30/123.5 |
| 5,337,480 A | 8/1994 | Codikow | 30/114 |
| 6,243,952 B1 | 6/2001 | Holcomb et al. | 30/114 |

FOREIGN PATENT DOCUMENTS

| | | |
|---|---|---|
| CA | 275549 | 3/1927 |
| CA | 210822 | 11/1927 |
| CA | 470436 | 1/1951 |
| GB | 756361 | 9/1956 |
| WO | WO 00/13560 | 3/2000 |

*Primary Examiner*—Charles Goodman
(74) *Attorney, Agent, or Firm*—Seed IP Law Group PLLC (57) ABSTRACT

A single-handedly operated citrus fruit segmenter having first and second arms such that squeezing the arms into a closed position causes a curved movable scoop to extend into a citrus fruit proximate to a triangular blade and form a segment-shaped compartment. The actuation of the curved movable scoop occurs by a user squeezing the first arm toward the second arm. A pin on the first arm is operatively connected to an elongated slot of a cam mechanism such that the rotation of the first arm about its pivot location causes the cam mechanism to rotate about its own pivot location. Therefore, the cam mechanism, being also connected to the curved movable scoop, forces the curved movable scoop into the citrus fruit.

20 Claims, 6 Drawing Sheets

CITRUS FRUIT SEGMENTER

BACKGROUND OF THE INVENTION

1. Field of the Invention

This invention relates to hand operated devices for removing an individual segment or several segments of a citrus fruit using a one-handed citrus fruit-segmenting device.

2. Description of the Related Art

Numerous patents disclose devices for cutting a segment or segments from citrus fruit. U.S. Pat. No. 2,321,725, for example, illustrates the most basic type of segmenter in which a blade of a single length of flat metal wire is bent to form a loop and the wire is drawn through a segment of the fruit. U.S. Pat. No. 1,794,800 illustrates another type of segmenter in which a single blade is drawn through the fruit to cut a segment or segments. Canadian Patent 4,70,436 illustrates a more complicated segmenter device for removing all of the segments of a citrus fruit simultaneously using a device, which requires two hands to operate the movable scoop relative to the fixed triangular blades. The segmenting device shown in the Canadian patent offers the advantage of slicing a segment or segments and then entrapping the segment by moving a curved movable scoop along the inside surface of the citrus fruit skin until a segment is trapped between the scoop and the fixed triangular cutting blades. However, the Canadian device is cumbersome to use and thus detracts from the desirability of easily removing a grapefruit segment from a grapefruit or an orange segment from a large orange.

U.S. Pat. No. 6,243,952, issued to Holcomb et al., illustrates a one-hand-operated citrus fruit segmenter whereby a movable scoop is driven into the citrus fruit by the actuation of a pair of finger pads coupled to a rack and pinion drive system. U.S. Pat. No. 6,243,952 is incorporated herein by reference in its entirety. It has been found that the fruit segmenting device of the '952 patent can be difficult to maintain due to citrus fruit build-up within the gear teeth, may create ergonomic issues with the finger-actuated trigger mechanism, and the mechanical advantage produced by the internal mechanism was less than adequate to force the curved movable scoop completely into the citrus fruit without requiring more effort than desired on the finger actuated mechanism.

BRIEF SUMMARY OF THE INVENTION

The present invention is directed to a device for removing citrus fruit segments. Three of the objects of the present invention are to make the arms easy to grip for various sizes of hands, to simplify the actuation mechanism to reduce jamming and enhance maintainability, and to increase the mechanical advantage of the movable scoop as it moves through the citrus fruit.

In accordance with a first embodiment of the present invention, one feature is to provide a one-handed operated citrus fruit segmenter which can remove one segment or up to several segments, but less than all of the segments, by moving one or both of two arms from an open position into a closed position. The movement of the arms into the closed position drives a movable scoop from a retracted position to an extended position, entrapping a segment of fruit between the scoop and a fixed blade. This one-handed operation is simple to perform, easy to use, and easy to control.

A second feature of the invention is a unique operating mechanism for advancing a curved movable scoop of a citrus fruit segmenter into a citrus fruit with minimum effort. A first arm, preferably the arm graspable by the fingers of the user, is rotated about a pivot location relative to a second arm. The first arm is operatively connected to a cam mechanism. The cam mechanism is configured with an elongated slot to receive a pin portion of the first arm. Movement of the first arm pin portion within the elongated cam slot forces the cam to rotate about its own pivot location. Therefore, a user having already pushed the segmenter into the citrus fruit, merely applies a squeezing force on the arms to move one or both of them into the closed position, thus causing the rotation of the cam which drives the curved movable scoop into the citrus fruit.

The interaction between the first arm and the cam mechanism creates a mechanical advantage between the force exerted by the user in squeezing the arms into the closed position and the corresponding force exerted by the cam mechanism in forcing the curved movable scoop into the citrus fruit. The mechanical advantage is obtained because the distance between the cam pivot location and the first arm pin portion continually increases as the arms move into their closed position. Therefore, a constant, applied force by a user in squeezing the arms together is translated into a continually increasing force that the movable curved scoop exerts on the fruit.

A third feature of the invention is the simplicity of the actuation components within the segmenter. The smooth, contoured surfaces of the cam mechanism, first arm, and movable scoop make cleaning and maintaining the segmenter much easier.

A second embodiment of the present invention replaces the cam mechanism with a lever-to-lever actuation mechanism. In the second embodiment, the first arm acts as the first arm lever having a surface to maintain contact with a second lever. The first arm lever pivots about a fixed location proximate to the mid region of the first arm lever; whereas the second lever pivots about a fixed location on the lower region of the second lever. The end of the second lever opposing the lever pivot location is attached to the curved movable scoop such that the rotation of the second lever drives the curved movable scoop into the citrus fruit.

The first arm lever and the second lever remain in relative contact during most or all of the actuation cycle. The first arm lever and the second lever may be contoured to have raised contact surfaces. The relative rotation of the levers with respect to each other creates a mechanical advantage similar to that described in the first embodiment. In essence, a squeezing force supplied by the user corresponds to an increasing torque about the second lever pivot location.

Additionally, a biasing member may be connected to the second lever such that the biasing member acts to urge the first arm lever and the second arm into the open position when no squeezing force is applied to the device. However, the biasing member could also be positioned outside of the actuation region as described in the first embodiment. In so doing, the biasing member would not be subject to interaction with the citrus fruit, thus making the device easier to clean and maintain.

DETAILED DESCRIPTION OF THE INVENTION

The present detailed description is directed toward devices for removing one or more citrus fruit segments with one hand. Several details of certain embodiments of the invention are set forth in the following description and illustrated in FIGS. 1–7 to provide a thorough understanding of those embodiments. One skilled in the art, however, will understand that the present invention may have additional embodiments and may be practiced without several of the details described in the following description and illustrated in the figures.

Figure 1:
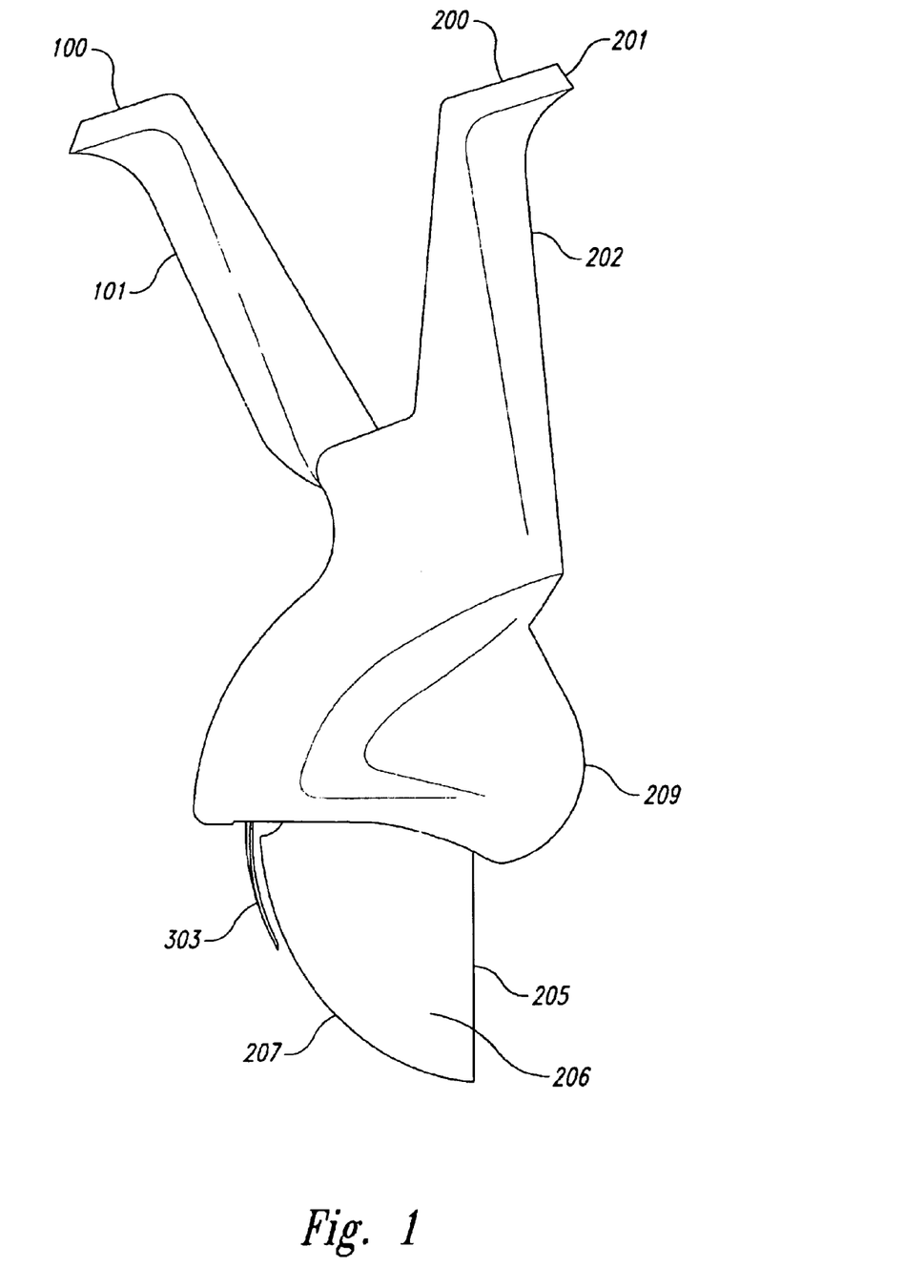
FIG. 1 is an external view of a segmenter according to one embodiment of the present invention in the open position.
Figure 2:
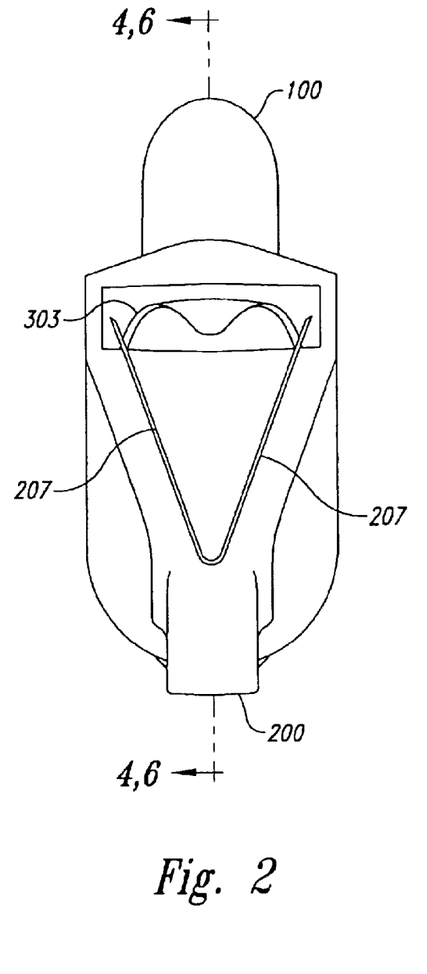
FIG. 2 is an end view of the segmenter of FIG. 1 in the open position.
Figure 3:
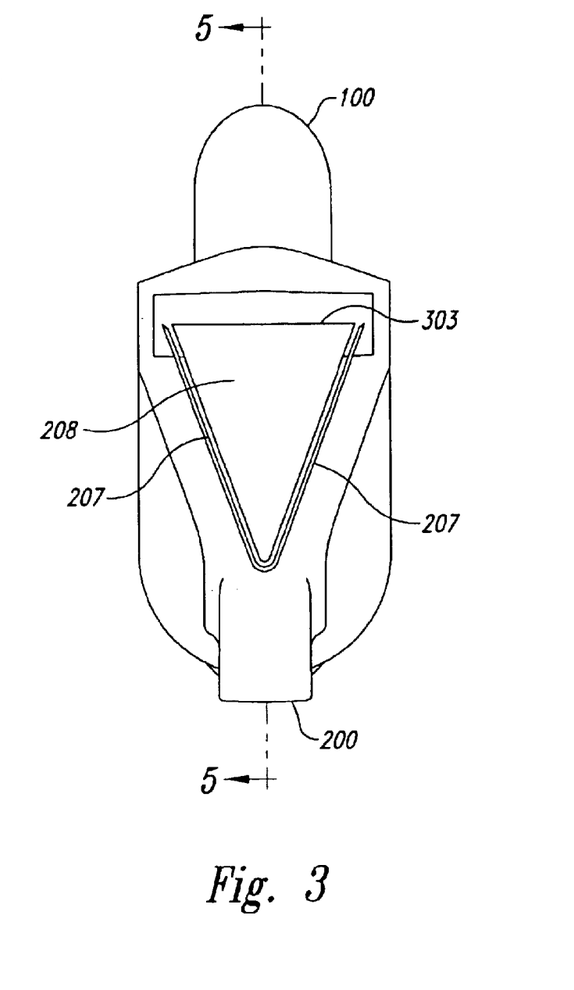
FIG. 3 is an end view of the segmenter of FIG. 1 in the closed position.
Figure 4:
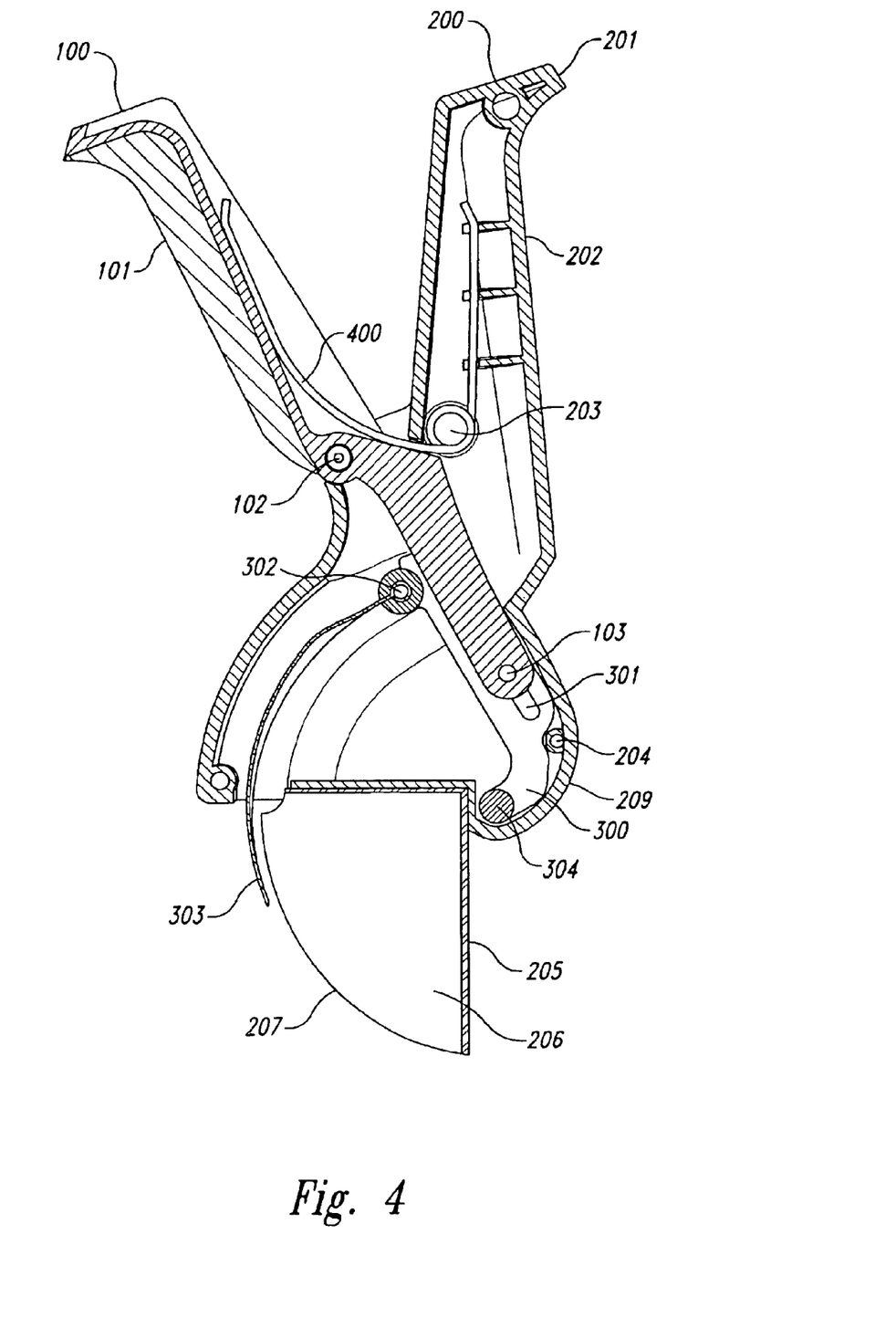
FIG. 4 is cross-sectional view of the segmenter of FIG. 1 in the open position, viewed along Section 4—4 of FIG. 2.

In a first embodiment, illustrated in FIGS. 1–6, the segmenter includes two hand graspable arms 100 and 200 urged apart by a biasing member 400 (FIG. 4). The first arm 100 is coupled to a cam mechanism 300 (FIG. 4). Rotation of the cam mechanism 300, caused by a user one-handedly squeezing the first 100 and second 200 arms into the closed position (see FIG. 5), forces a curved movable scoop 303 along the inside surface of a citrus fruit. The curved movable scoop 303, in turn, moves along the curved surface 207 of a triangular blade 206 to form a segment-shaped compartment 208. Once the segment is captured, a biasing member 400 (FIG. 4) urges the first and second arms 100, 200 back to the open position (see FIG. 4) after the user releases their grip.

Figure 5:
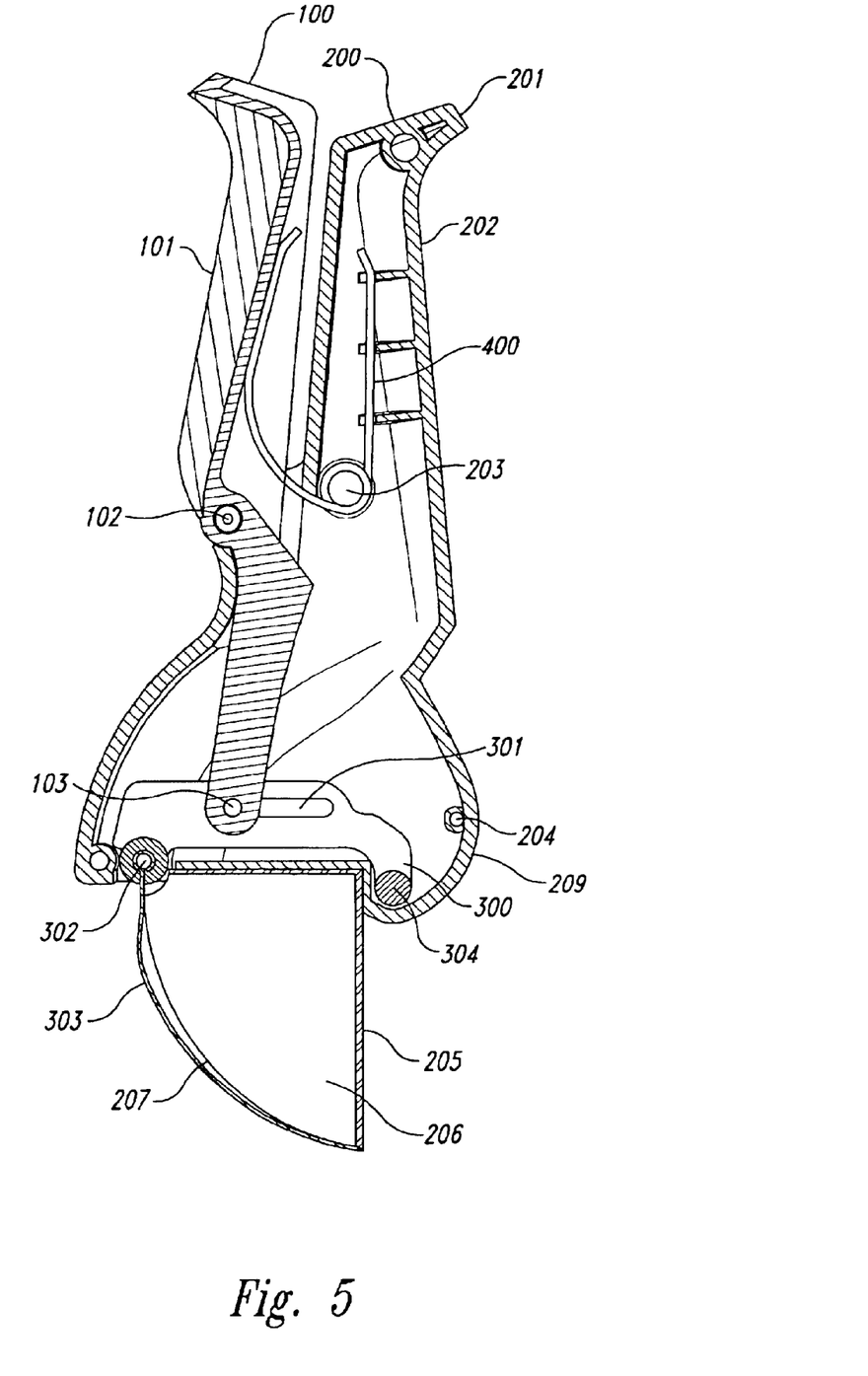
FIG. 5 is cross-sectional view of the segmenter of FIG. 1 in the closed position, viewed along Section 5–5 of FIG. 3.

The biasing member 400, for example, may be a torsional spring. The biasing member 400 illustrated in FIGS. 4 and 5 is in contact with the first arm 100 and connected to the second arm 200 at a torsional pivot location 203. The biasing member 400 acts to urge the first arm 100 away from the second arm 200 and into the open position. The resistance of the biasing member 400 is such that the first 100 and second 200 arms will be urged apart, but the squeezing of the arms into the closed position will not be adversely hindered.

The graspable portions 101 and 202, respectively, of the arms may be contoured or otherwise adapted to conform to the fingers and the palm of a user's hand. For example, the grip portion of the first arm 100 could have a contoured surface 101 or resilient coating for receiving the fingers of a user's hand. Correspondingly, the second arm grip portion 202 or resilient coating could be rounded and smooth to receive the palm of a user's hand. The second arm 200 may also contain a thumb-rest region 201; thus, a user could apply downward force with their thumb to initially assist urging the triangular blade 206 into the citrus fruit.

The illustrated segmenter contains a generally triangular blade 206 fixed with respect to the second arm 200 of the segmenter. The triangular blade 206 is configured with a curved terminal edges 207, which simulates the curved, inner surface of the skin of a citrus fruit. The leading edge 205 of the triangular blade can enter in the center region of the citrus fruit while the blade's curved terminal edges 207 can conform to the inside surface of the citrus fruit skin. The blades 206, 303 may be stainless steel or otherwise adapted to resist corrosion due to the acidic citrus fruit juices. The triangular blade 206 may be fixed to the segmenter by conventional attachment means. In another embodiment, the triangular blade may be made of a rigid plastic material with flanged ends. The connection of the triangular blade 206 to the segmenter could be a snap-fit such that removal of the triangular blade 206 for cleaning purposes would be quick and easy.

Adjacent the triangular blade 206, a curved movable scoop 303 can move from a retracted, or open, position (see FIG. 4) to an extended, or closed, position (see FIG. 5). As the curved movable scoop 303 is extended, it complements the triangular blade 206 to form a segment-shaped compartment 208. In the present embodiment, the connection of the curved movable scoop 303 to the cam mechanism 300 may be a permanent connection (i.e., welded or mechanically fastened). However, the attachment of the curved movable scoop 303 to the cam mechanism 300 may also be easily detachable for cleaning and sharpening purposes.

Figure 6:
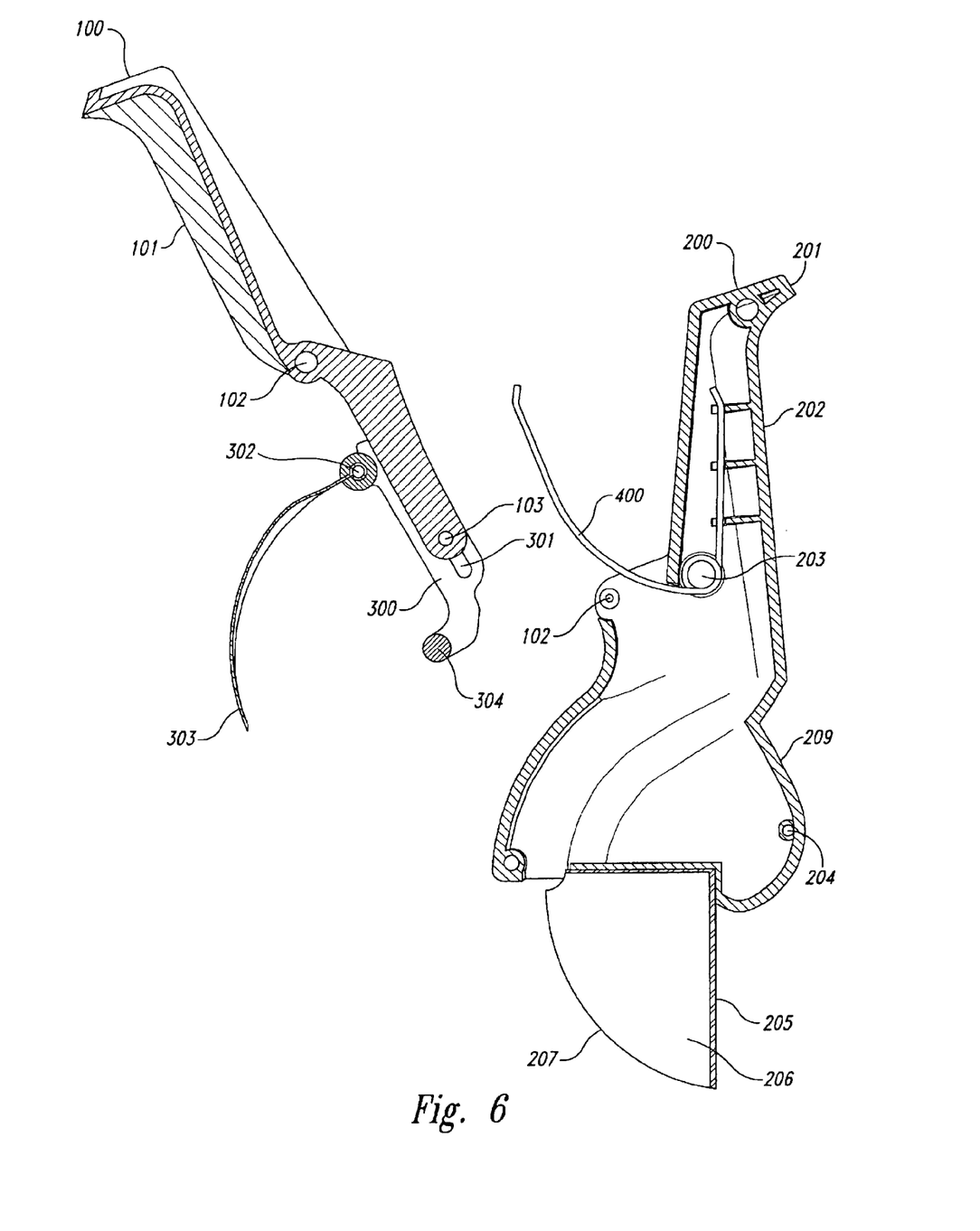
FIG. 6 is an exploded cross-sectional view of the segmenter of FIG. 1, viewed along Section 6—6 of FIG. 2.

The operating mechanism for extending the curved movable scoop 303 from the retracted position to the extended position is illustrated in FIGS. 4–6. The actuation components of the segmenter are primarily contained in the housing region 209 of the segmenter. The actuation components consist of the first arm 100, the cam mechanism 300, and the curved movable scoop 303. The gripping force supplied by a user causes the first arm 100 to rotate about a first arm pivot location 102, such rotation being relative to the second arm 200. The first arm pivot location 102 may be configured to be a pin protruding inwardly from the second housing 209 (FIG. 6).

The first arm 100 further contains a lower pin portion 103 connectable to the elongated slot 301 of the cam mechanism 300. The interaction between the first arm pin portion 103 and the elongated slot 301 of the cam mechanism 300 creates the rotation of the cam mechanism 300 about a cam pivot location 304. When the segmenter is in the open position, the major axis of the elongated slot 301 can be generally parallel to the major axis of the first arm 100 (see FIG. 4). Conversely, when the segmenter is in the closed position, the major axis of the elongated slot 301 can be generally perpendicular to the major axis of the first arm 100 (see FIG. 5).

The elongated slot 301 receives the first arm pin portion 103, as previously noted. Further, the cam mechanism 300 incorporates a cam pivot location 304 and a scoop end 302. The scoop end 302 of the cam mechanism 300 is attachable to the curved movable scoop 303. The distance from the cam pivot location 304 to the scoop end 302 of the cam mechanism can be generally equivalent to the radius of the arc formed by the curved movable scoop 303, as it is desirable for the curved movable scoop 303 to follow the contour of the inner surface of a citrus fruit skin.

The configuration of the first arm 100 relative to the cam mechanism 300 provides that, during closing of the arms, the first arm 100 rotates about the first arm pivot location 102 in a clockwise manner. Conversely, the cam mechanism 300 is compelled by the first arm pin 103 to rotate in a counterclockwise manner about the cam pivot location 304. The inventor appreciates that the directions of rotation can be reversed.

A mechanical advantage is obtained due to the novel configuration and dynamic connectivity of the cam mechanism 300 relative to the first arm 100. In particular, the elongated slot 301 of the cam mechanism 300 allows the distance of the first arm pin portion 103 relative to the cam pivot location 304 to vary. The illustrated embodiment is configured such that the torque about the cam pivot location 304 increases as the first arm pin portion 103 moves in the elongated slot 301 away from the cam pivot location 304. Therefore, the user may find that the curved movable scoop 303 easily moves into the citrus fruit without the user having to provide any additional gripping force.

Once the curved movable scoop 303 is in the extended position, a user can simply maintain the two arms 100 and 200 in the closed position and remove the segmenter from the fruit; thereby removing one or more segment-shaped 208 sections of citrus fruit. The biasing mechanism 400 allows the user to merely release their grip of the first 100 and second 200 arms causing the arms to spring back into the open position; thus releasing the segment of fruit.

The second arm 200 is comprised of the a grip portion 202, which can be contoured to closely mate with the palm of a user's hand, a housing region 209 for the actuation components, and the generally triangular blade 206. The housing region may contain a stop 204 to limit the travel of the cam mechanism 300.

Figure 7:
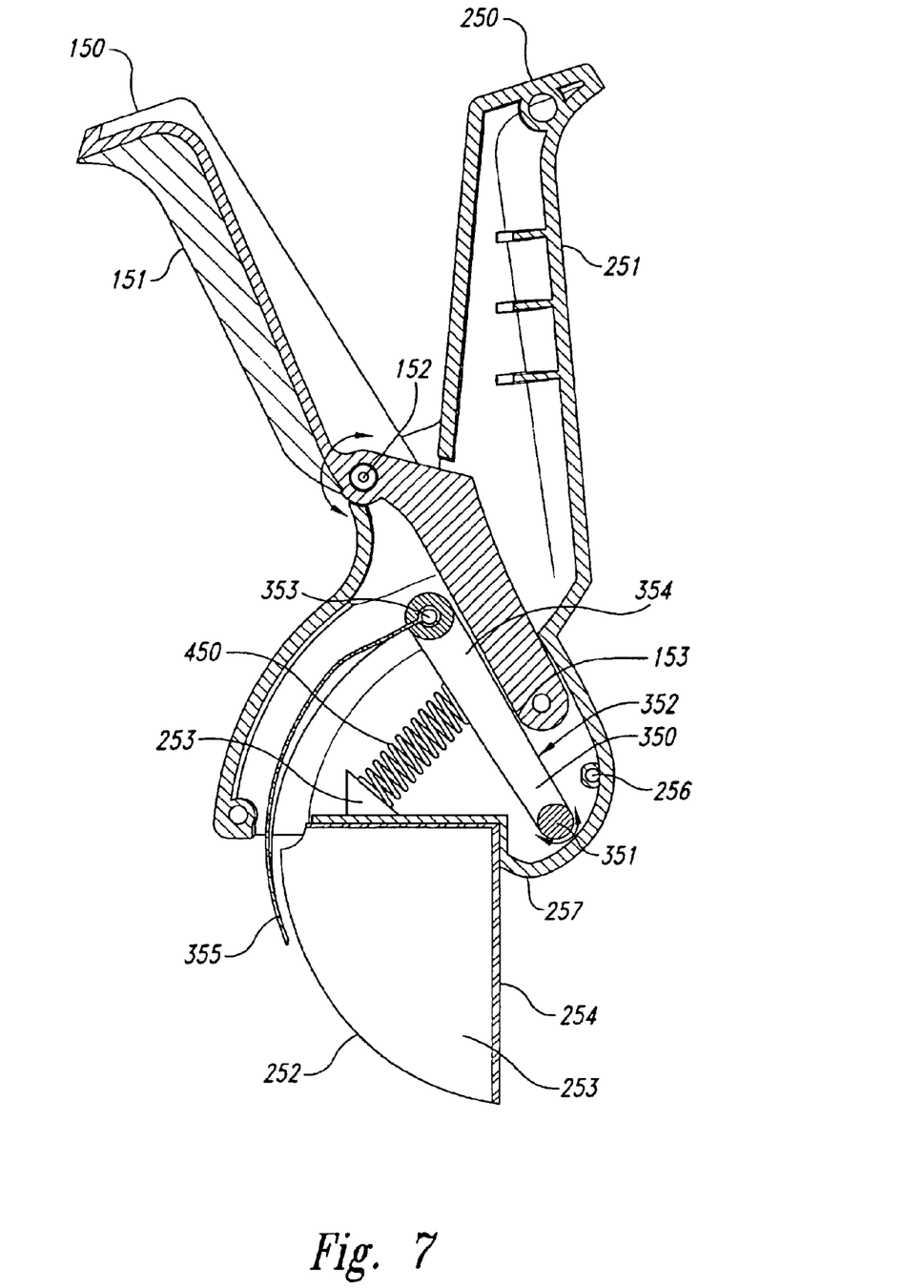
FIG. 7 is a cross-sectional view of a segmenter according to a second embodiment of the present invention.

A second embodiment of the present invention, illustrated in FIG. 7, replaces the cam mechanism 300 with a second lever 350. The second arm 250 is not significantly different from the second arm 200 described in connection with the first embodiment. The second arm 250 and body consist of a grip portion 251, a housing region 257, and may also contain a stop 256 to limit the movement of the second lever 350. Additionally, the triangular blade 253 with terminal ends 252 and a leading edge 254 is similar to the triangular blade 206 described in connection with the first embodiment. Finally, the curved movable scoop 355 does not differ significantly from the curved movable scoop 303 described above.

In the second embodiment, a first arm lever 150, containing a grip portion 151, a pivot location 152, and having a contact portion 153, is in contact with the second lever 350. The second lever 350 contains a lever pivot location 351, a lengthwise contact portion 352, and a scoop portion 353. The first arm lever 150 pivots about the pivot location 152 proximate to the intersection of the body and the second arm 250; whereas the second lever 350 pivots about a lever pivot location 351 on the lower region of the body.

The first arm lever 150 and the second lever 350 can remain in relative contact during the actuation cycle. The first arm lever 150 and the second lever 350 may be contoured to have raised contact surfaces 153 and 354. The relative rotation of the levers with respect to each other creates a mechanical advantage similar to that described in connection with the first embodiment. In essence, a constant squeezing force supplied by the user corresponds to an increasing torque about the second lever pivot location 351.

Additionally, a biasing member 450 may be connected to the triangular blade top 253 such that the biasing member 450 acts to urge the first arm lever 150 and the second arm 350 into the open position when the user applies no squeezing force. However, it may be preferable to place the biasing member 450 outside of the actuation region of the housing 257. In so doing, the biasing member 450 would not be subjected to interaction with any citrus fruit residue, thus making the device easier to clean and maintain.

As is readily apparent after reviewing this disclosure, the segmenter is operated by grasping both arms 100 and 200 with only one hand while the free hand is used to hold the cut half of the citrus fruit. The user then presses the triangular blade 206 into the fruit until the ends of the blade engage the inside of the skin of the fruit. The user then pulls the first arm 100 relative to the second arm 200 into the closed position thereby extending the curved movable scoop 303 into the fruit. Because of the mechanical advantage supplied by the interaction of the first arm 100 and the cam mechanism 300, the user does not have to exert a great deal of force to squeeze the arms into the closed position.

While this unique one-handed operation could be accomplished by other mechanisms, the advantage of a cam actuated device is advantageous over other segmenters because it makes the segmenter easy to use and provides sufficient force for the normal user to easily apply a minimal amount of pressure to the gripping arms 100 and 200 to remove a segment of fruit. A further advantage of the cam mechanism 300 is that it is easier to maintain and clean.

However, it needs to be understood that variations can be made in the operating mechanism by one skilled in the art and thus the invention is not to be limited to the specific embodiments illustrated in the drawing.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A citrus fruit segmenter single-handedly operable between an open position and a closed position, comprising:
    a frame;
    first and second arms coupled to the frame and configured to be simultaneously actuated with one hand, at least the first arms having a rigid body including a grip portion, a pin portion and an arm pivot location, the first arm being pivotable with respect to the frame about the arm pivot portion between the open position and the closed position;
    a cam mechanism operatively engaged with the pin portion of the first arm, the cam mechanism including an elongated slot for receiving the pin portion, the cam mechanism further including a cam pivot location toward one end thereof and a scoop end toward an opposing end, the cam mechanism being configured to pivot about the cam pivot location in response to actuation of the first arm, the elongated slot extending in a direction selected to cause a distance to increase between the pin portion and the cam pivot location as the first arm moves from the open position toward the closed position; and
    a blade coupled to the scoop end of the cam mechanism to move with the cam mechanism and into and out of the citrus fruit in response to the actuation of the first arms.

2. The segmenter of claim 1 wherein a generally triangular blade is fixed to the segmenter opposite the other of the first and second arms, the triangular blade configured to mate with the movable blade such that the triangular blade and the movable blade in the closed position form a segment-shaped compartment.

3. The segmenter of claim 2 wherein the triangular blade is stainless steel.

4. The segmenter of claim 1 wherein the distance between the pin portion and the cam pivot location continuously increases as the first arm moves toward the closed position.

5. The segmenter of claim 1 wherein moving the first and second arms into the closed position causes the first arm to rotate in a first direction and the cam mechanism to rotate in an opposing second direction.

6. The segmenter of claim 1, further comprising a stop to limit the travel of the cam mechanism.

7. The segmenter of claim 1, further comprising a biasing member configured to urge the first arm toward the open position.

8. The segmenter of claim 1 wherein the grip portion of the first arm is contoured to mate with at least two fingers.

9. The segmenter of claim 1 wherein a major axis of the elongated slot of the cam mechanism is generally aligned parallel to a major axis of the first arm.

10. A citrus fruit segmenter single-handedly operable, comprising:

a frame;

a first lever including a grip portion, a contact portion and a first pivot location, the first pivot location being pivotally coupled to the frame, the first lever being pivotable about the first pivot location between an open position and a closed position;

a second lever having a second pivot location and a scoop portion, the second pivot location being pivotally coupled to the frame, the second lever being configured to rotate about the lever pivot location in response to actuation of the first arm lever, the second lever also having an elongated surface in slidable contact with the contact portion of the first lever, the elongated surface being oriented such that as the first arm moves from the open position toward the closed position, a distance increases between the contact portion of the first lever and the second pivot location;

a scoop coupled to the scoop portion of the second lever such that actuation of the second lever creates movement of the scoop from a retracted position corresponding to the open position of the first lever to an extended position corresponding to the closed position of the first lever.

11. The segmenter of claim 10 wherein the scoop is extendable toward a triangular blade to form a segment-shaped compartment to entrap a fruit segment.

12. The segmenter of claim 11 wherein the triangular blade is stainless steel.

13. The segmenter of claim 10 wherein the distance between the second pivot location and the contact portion of the first arm lever continually increases, thus creating a continuously increasing mechanical advantage, when the first lever is moved toward the closed position from the open position.

14. The segmenter of claim 10 wherein the actuation of the first lever into the closed position causes the first lever to rotate in a clockwise direction while forcing the second lever to rotate in a counterclockwise direction.

15. The segmenter of claim 10 wherein the second lever includes a stop to limit the travel of the second lever.

16. The segmenter of claim 10, further comprising a spring attached to the second lever such that the spring acts to urge the first lever toward the open position.

17. The segmenter of claim 10 wherein the grip portion of the first lever is contoured to complement at least two fingers.

18. The segmenter of claim 10 wherein the elongated surface of the second lever is generally aligned along a major axis of the first lever when the first lever is in the open position.

19. The segmenter of claim 10 wherein the contact portion of first lever and the lengthwise portion of the second lever are contoured.

20. The segmenter of claim 10 wherein the contact portion of the first lever and the elongated surface of the second lever are configured with low-friction and wear resistant surfaces.

* * * * *